United States Patent Office 3,445,269
Patented May 20, 1969

3,445,269
ABRASION RESISTANT GLASS ARTICLE AND
METHOD FOR PRODUCING SAME
Howard G. Bruss, Jr., Toledo, Ohio, Walter J. Schlientz,
Rome, Ga., and Bradley E. Wiens, Toledo, Ohio, assignors to Owens-Illinois, Inc., a corporation of Ohio
No Drawing. Filed Dec. 7, 1965, Ser. No. 512,238
Int. Cl. C03c 17/06
U.S. Cl. 117—88                                    8 Claims

ABSTRACT OF THE DISCLOSURE

The scratch resistance of glass surfaces is improved by the application of a pyrolyzable stannic compound to form a tenaciously adherent tin oxide coating, and then coating with an emulsion of a fatty acid triester of glycerol.

The instant invention relates to a process for improving the scratch resistance of glass surfaces, and particularly the exterior surfaces of glassware such as jars, bottles, tumblers and the like which are subject to abrasive contact with others in the course of manufacturing, packaging, filling and shipping. The invention further relates to improved abrasion resistant glass articles of commerce produced by the aforesaid method.

Glass derives its strength from an unblemished surface and any scratches or flaws which are present on its surface decrease its strength many fold. Generally, glass articles of commerce have their maximum strength as soon as they are formed and this strength decreases as the articles come into contact with each other and with other surfaces.

It will be appreciated by those skilled in the art that if the glass surface is coated with a composition having good wet and dry scratch resistance or abrasion resistance properties, which by imparting said scratch resistance decrease the likelihood of breakage, more bottles can be handled by filling and packaging apparatus in the same amount of time merely by spacing the bottles closer together and by increasing the speed of the conveyors, even though the glass surfaces will be subject to more contact with other surfaces. Also, since many products are packaged under pressure, for example, carbonated beverages, it is very desirable that the surface of the glass container have as few scratches as possible to minimize the possibility of breakage.

Accordingly, it is an object of the instant invention to provide an abrasion resistant coating composition which will afford sufficient protection against abrasive actions so as not to weaken the glass product.

It is a further object of this invention to provide a thin substantially transparent coating on a glass surface which coating is highly resistant to abrasion, while simultaneously substantially maintaining the strength characteristics of the glass.

Still another object of this invention is to provide a method for coating glass surfaces, such as the exterior of a glass container, so as to impart thereto scratch resisting properties, thus permitting the container to undergo normal handling, processing and shipping with the consequent rubbing of the glass surface with other surfaces without materially decreasing the strength of the container.

In attaining the objects of this invention, it has now been found that increased scratch resistance can be imparted to a glass surface by treating said glass surface with a tin compound which is pyrolyzable, that is, chemically decomposed by the action of heat to form oxides of the metal on the glass surface while the glass surface is a temperature above the pyrolyzing temperature of the compound, cooling the tin-treated glass, such as in an annealing lehr, and applying to the cooled surface a fatty acid triester of glycerol.

In carrying out the instant invention, the glass article of commerce is first treated soon after the article leaves the glass-forming machine and as it is being conveyed to the annealing lehr. A solution of the pyrolyzable compound is sprayed onto the exterior surface of the glass at a temperature above the pyrolyzing temperature of the compound. The pyrolyzing temperature for tin compounds that may be used herein is between about 700° F. and 1,300° F., depending, of course, upon the particular compound used, with the now preferred range being from about 900° F. to 1,200° F.

The tin compounds that can be used for the purpose of the present invention are the stannic compounds. Among the suitable stannic compounds are the stannic halides and the alkyl stannic carboxylates. The stannic halides may be exemplified by stannic chloride, stannic bromide, and stannic iodide. The alkyl stannic carboxylates have the general formula $(R_1)_xSn(OOCR_2)_y$ wherein $R_1$ and $R_2$ are alkyl groups and wherein $x$ and $y$ are whole numbers from one to three, the sum of which is equal to four. The alkyl groups may be branched or straight chain. The $R_2$ alkyl group preferably contains from one to eighteen carbon atoms, such as stearate, palmitate, laurate, and the like. The $R_1$ alkyl group preferably contains one to eight carbon atoms such as methyl, propyl, butyl, isopropyl, hexyl, octyl and the like. Included among the compounds coming within the scope of the foregoing are dibutyl tin diacetate, dipropyl tin diacetate, dioctyl tin diacetate, dibutyl tin distearate, dibutyl tin dipalmitate, dibutyl tin dilaurate, dibutyl tin maleate, and the like. The oxide layer, formed at the pyrolyzing temperature, is tightly adhered to the surface of the glass and is believed to have an average thickness of up to about one micron, but is preferably less than one micron. The now preferred ideal range is about 10 to about 100 millimicrons.

As the glass articles, now coated with a thin oxide layer, enter the annealing lehr, they are progressively cooled over a period of time to about 450° F. and lower, where they are sprayed with a second coating of an ester of glycerol. Among the esters of glycerol that can be employed for the second coating are the triesters of glycerol, that is, the esters of acids with glycerol. The acids for forming the esters of glycerol include both the saturated and unsaturated fatty acids. The fatty acid generally contains from about two to twenty carbon atoms, with the now preferred carbon range containing about ten to twenty carbon atoms. As examples of fatty acids may be mentioned butyric, caproic, lauric, palmitic, arachidic, lauroleic, palmitoleic, and the like. The triesters of glycerol employed for the purpose of the invention include both the mixed and unmixed esters of glycerol. Included among the triglycerides for the purpose of the invention are glycerol triacetate, glycerol tributyrate, glycerol trioleate, glycerol tripalmitate, glycerol tristearate, oleodistearin, oleodipalmitin, stearodiolein and the like.

The triesters of glycerol are conveniently employed for spraying in an emulsified form. For emulsifying, the commercially available surface-active agents such as Arquad, Ethofats, Ethomeens, Igepal, Myrj, Span, Tween and the like are employed.

The organic coating composition can be applied by any suitable means such as a traversing spray nozzle or varying rates such as about one pint to about one quart of the organic coating per 100 square feet of lehr belt. In practice the rate may vary from about ½ to about 5 quarts per 100 square feet. Desirably, the spraying is done near the cold end of the lehr when the glassware is in a temperature range of about 100 to about 450° F.

The above objects, features, advantages and examples are not to be construed as limiting the instant invention as these and other features will become apparent to those skilled in the art. The following examples are merely illustrative of the present invention and should not be considered limiting its scope in any way.

EXAMPLE I

An emulsion of glycerol trioleate was prepared by intimately mixing with constant stirring 125 grams of Estrex 3G-10 (Swift and Company, glycerol trioleate), 31 milliliters of Renex 30 (Atlas Chemical Company, polyoxythylene ether alcohol), and 650 milliliters of deionized water. This emulsion concentrate was diluted to 0.20% for spraying over tin-treated bottles at a rate of about 2.5 gallons per hour for a 6 foot lehr mat traveling at about 2–3 feet per minute.

EXAMPLE II

Stannic chloride was applied to the exterior surface of freshly formed glass containers as they were continuously being conveyed from the bottle forming machine to the annealing lehr. Dry air was bubbled through the liquid stannic chloride and this air stream, rich in stannic chloride, was directed to the transfer belt between the annealing lehr and the forming machine. A metal enclosure was placed over the transfer belt in order to confine the stannic chloride and air mixture in the vicinity of the freshly formed bottles. The temperature of the surface of the glass was about 1,100° F., and the stannic chloride was pyrolyzed almost immediately. A clear, transparent coating formed upon the surface of the bottles which was hard, but the bottles could, nevertheless, be scratched by firmly rubbing two containers against each other.

EXAMPLE III

A number of bottles treated in accordance with Example II were sprayed at the cold end of the lehr with the glycerol trioleate prepared according to Example I. The emulsion was sprayed onto the surface of the glass when the glass surface temperature was about 300° F.

EXAMPLE IV

A number of uncoated bottles were sprayed at the cold end of the lehr with the glycerol trioleate of Example I. The technique employed was as above described.

Uncoated bottles, bottles coated with tin, bottles coated with the emulsion and bottles that were coated with both tin and emulsion were tested with a scratch test machine to evaluate the effectiveness of the respective coatings. The scratch test machine is designed to abrade the surface of one glass against the surface of a similar bottle. One bottle is fastened securely in the stationary lower set of chucks. The other bottle is fastened in the upper chucks which are positioned so that the axis of the bottles will be at 90° to each other. The test load is applied to the upper bottle which is driven at a constant speed of 2.8 inches per minute in a direction of 45° to the axis of either bottle. The actual rate of scratch propagation on the bottle is then two inches per minute.

By this design, a fresh surface of one bottle is always contacted with a fresh surface of the other. Since the base of each bottle extends in the direction of motion, the scratch is propagated from the shoulder to the base. This permits the detection of poor scratch protection in a particular section of the ware since identical sections of each bottle are contacted.

The force exerted by the second bottle is a known, measured force, and after each pass, the bottles are examined for scratches. The force, or load, in pounds was measured with respect to the scratch resistance of the dry bottles, of bottles which were wetted with water, that is, the test machine can be filled with water and the scratch evaluation performed with the contacting surfaces submerged. These test results are reported as wet scratch protection. The scratch protection was also measured with bottles which had been subjected to a caustic wash comprising a 5% NaOH aqueous solution at a temperature of 150° F. for a period of one-half hour.

Another property that has been measured to demonstrate the characteristics of the instant invention is lubricity. Lubricity is measured by determining the angle at which the top bottle in a pyramid of three bottles on their sides will start to slide when the support is tilted. What is measured is the starting friction or the angle of repose. The tangent of the angle of repose is the coefficient of friction when motion is impending, which value is inversely related to the lubricity of the glass surface. Untreated bottles will reach an angle of 35 to 40° before sliding. A good lubricious surface will permit a dry bottle to slide at 6 to 8°. Bottles are run dry and wet, before and after caustic. The results of these tests are presented below.

TABLE I.—NUMBER OF POUNDS TO PRODUCE SCRATCH

|  | Dry | Wet | After caustic wash Dry | Wet |
|---|---|---|---|---|
| Uncoated bottles | 2 | 3 | 2 | 5 |
| Ester of glycerol alone | 30 | 10 | 10 | 10 |
| Tin (Stannic) alone | 5 | 5 | 5 | 5 |
| Tin (Stannic) and glycerol ester | 100+ | 70 | 10 | 55 |

TABLE II.—ANGLE OF RESPONSE

|  | Dry | Wet | After caustic wash Dry | Wet |
|---|---|---|---|---|
| Uncoated bottles | 35 | 40 | 40 | 40 |
| Glycerol ester alone | 15 | 45 | 10 | 10 |
| Tin (Stannic) alone | 39 | 38 | 40 | 40 |
| Glycerol ester and tin (Stannic) | 10 | 29 | 22 | 26 |

The above results clearly demonstrate the unexpected and unobvious results produced by overcoating the first applied stannic coating with a coating comprising a composition of triesters of glycerol.

The double coated bottles further evidenced good labeling properties. Labels, glued to said bottles, adhered to the bottles during the glue's wet stage and in its dry form.

As is evident from the above examples and discussions, it is readily apparent that excellent damage preventing coatings are imparted to glass articles of commerce by first applying thereto a coating of a stannic compound which is capable of being pyrolyzed and then coating said coat with a triester of glycerol.

We claim:

1. A method for increasing the abrasion resistance of a glass surface which comprises treating said surface with a pyrolyzable stannic compound at a temperature at least as high as the pyrolyzing temperature of said compound to form an oxide coating of the metal on said glass surface, cooling said treated surface to a temperature below 450° F. and then spraying onto said surface an emulsion containing fatty acid triesters of glycerol.

2. The method according to claim 1 wherein the stannic compound is selected from the group consisting of stannic halides and alkyl stannic carboxylates of the formula $(R_1)_x Sn(OOCR_2)_y$, wherein $R_2$ is an alkyl group of one to eighteen carbons, $R_1$ is an alkyl of one to eight carbons, and wherein $x$ and $y$ are whole numbers of from one to three, the sum of which is equal to four.

3. The method according to claim 2 wherein the stannic compound is stannic chloride.

4. The method according to claim 1 wherein the fatty acid group of the fatty acid triester of glycerol contains from two to twenty carbons.

5. The method according to claim 4 wherein the triester is glycerol trioleate.

6. The method according to claim 4 wherein the triester is glycerol tripalmitate.

7. The method according to claim 4 wherein the triester is glycerol tristerate.

8. An article of manufacture comprising a glass container having a thin, tightly adhering, transparent, substantially colorless coating on its surface, said coating consisting essentially of an undercoating of stannic oxide and said oxide overcoated wtih a member selected from the group consisting of glycerol trioleate, glycerol tripalmitate and glycerol tristearate.

References Cited

UNITED STATES PATENTS 3,352,707  11/1967  Pickard _____ 117—72

ALFRED L. LEAVITT, *Primary Examiner.*

W. F. CYRON, *Assistant Examiner.*

U.S. Cl. X.R.

117—124, 69